(12) United States Patent
Kamma

(10) Patent No.: US 9,467,501 B2
(45) Date of Patent: Oct. 11, 2016

(54) RELAY SERVER SYSTEM

(71) Applicant: Yui Kamma, Kasugai (JP)

(72) Inventor: Yui Kamma, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 398 days.

(21) Appl. No.: 14/207,742

(22) Filed: Mar. 13, 2014

(65) Prior Publication Data
US 2014/0280724 A1 Sep. 18, 2014

(30) Foreign Application Priority Data

Mar. 15, 2013 (JP) .................. 2013-053801

(51) Int. Cl.
G06F 15/16 (2006.01)
H04L 29/08 (2006.01)

(52) U.S. Cl.
CPC .................... H04L 67/10 (2013.01)

(58) Field of Classification Search
CPC ........................................ H04L 67/10
USPC ................................. 709/217–218
See application file for complete search history.

(56) References Cited

U.S. PATENT DOCUMENTS

| 5,800,081 A | 9/1998 | Teradaira et al. | |
| 2006/0265473 A1* | 11/2006 | Muto | G06F 1/3203 709/218 |
| 2014/0204403 A1* | 7/2014 | Young | G06F 3/1293 358/1.14 |

FOREIGN PATENT DOCUMENTS

| JP | H07-137358 A | 5/1995 |
| JP | H10-222318 A | 8/1998 |

* cited by examiner

Primary Examiner — Chris Parry
Assistant Examiner — Weiwei Stiltner
(74) Attorney, Agent, or Firm — Banner & Witcoff, Ltd.

(57) ABSTRACT

A relay server system configured to communicate with a terminal apparatus and a communication apparatus, includes: a processor; and a memory storing instructions causing the relay server system to: receive a request command from the terminal apparatus, the request command being a command to request the relay server system to transmit condition information to the communication apparatus; transmit a first response command to the terminal apparatus when receiving the request command; transmit the condition information to the communication apparatus when receiving the request command; receive an inquiry command from the terminal apparatus receiving the request command, the inquiry command being a command for inquiring of the relay server system whether the transmission of the condition information is completed; and transmit a second response command to the terminal apparatus when receiving the inquiry command, the second response command including situation information.

11 Claims, 6 Drawing Sheets

RELAY SERVER SYSTEM

CROSS REFERENCE TO RELATED APPLICATION

This application is based upon and claims the benefit of priority of Japanese Patent Application No. 2013-053801 filed on Mar. 15, 2013, the contents of which are incorporated herein by reference in its entirety.

BACKGROUND

The disclosure relates to a relay server system that performs communication with each of a terminal apparatus and a communication apparatus.

There is a system including a host computer and a printer. When the printer receives a trap setting command from the host computer, the printer sets a condition of transmitting a trap packet. Thereby, the printer transmits the trap packet, which indicates a status of the printer, to the host computer only when the status changes.

SUMMARY

In the specification of the present application, a technology, which enables a relay server system to execute appropriate processing when it should transmit condition information to a communication apparatus in response to a request from a terminal apparatus, is provided.

An aspect of the present disclosure provides the following arrangements:

A relay server system configured to communicate with a terminal apparatus and a communication apparatus, the relay server system comprising:

at least one processor; and at least one memory storing computer readable instructions, when executed by the at least one processor, causing the relay server system to:

receive a request command from the terminal apparatus, the request command being a command to request the relay server system to transmit condition information to the communication apparatus and the condition information being indicative of a condition to transmit data from the communication apparatus to the terminal apparatus;

transmit a first response command to the terminal apparatus when the relay server system receives the request command;

transmit the condition information to the communication apparatus when the relay server system receives the request command;

receive an inquiry command from the terminal apparatus after the relay server system receives the request command, the inquiry command being a command to inquire of the relay server system whether the transmission of the condition information to the communication apparatus is completed; and transmit a second response command to the terminal apparatus when the relay server system receives the inquiry command, the second response command including situation information indicative of whether the transmission of the condition information to the communication apparatus is completed.

A non-transitory computer readable recording medium storing a program for a relay server system including at least one processor, the program when executed by the at least one processor causing the relay server system to execute:

receive a request command from a terminal apparatus, the request command being a command to request the relay server system to transmit condition information to a communication apparatus and the condition information being indicative of a condition to transmit data from the communication apparatus to the terminal apparatus;

transmit a first response command to the terminal apparatus when the relay server system receives the request command;

transmit the condition information to the communication apparatus when the relay server system receives the request command;

receive an inquiry command from the terminal apparatus after the relay server system receives the request command, the inquiry command being a command to inquire of the relay server system whether the transmission of the condition information to the communication apparatus is completed; and transmit a second response command to the terminal apparatus when the relay server system receives the inquiry command, the second response command including situation information indicative of whether the transmission of the condition information to the communication apparatus is completed.

A control method, a computer program and a computer-readable recording medium storing the computer program for implementing the relay server system are also novel and useful. Also, a system including at least two devices of the relay server system, the terminal apparatus and the communication apparatus is also novel and useful.

DESCRIPTION OF EXEMPLARY EMBODIMENTS

Configuration of Communication System 2

Figure 1:
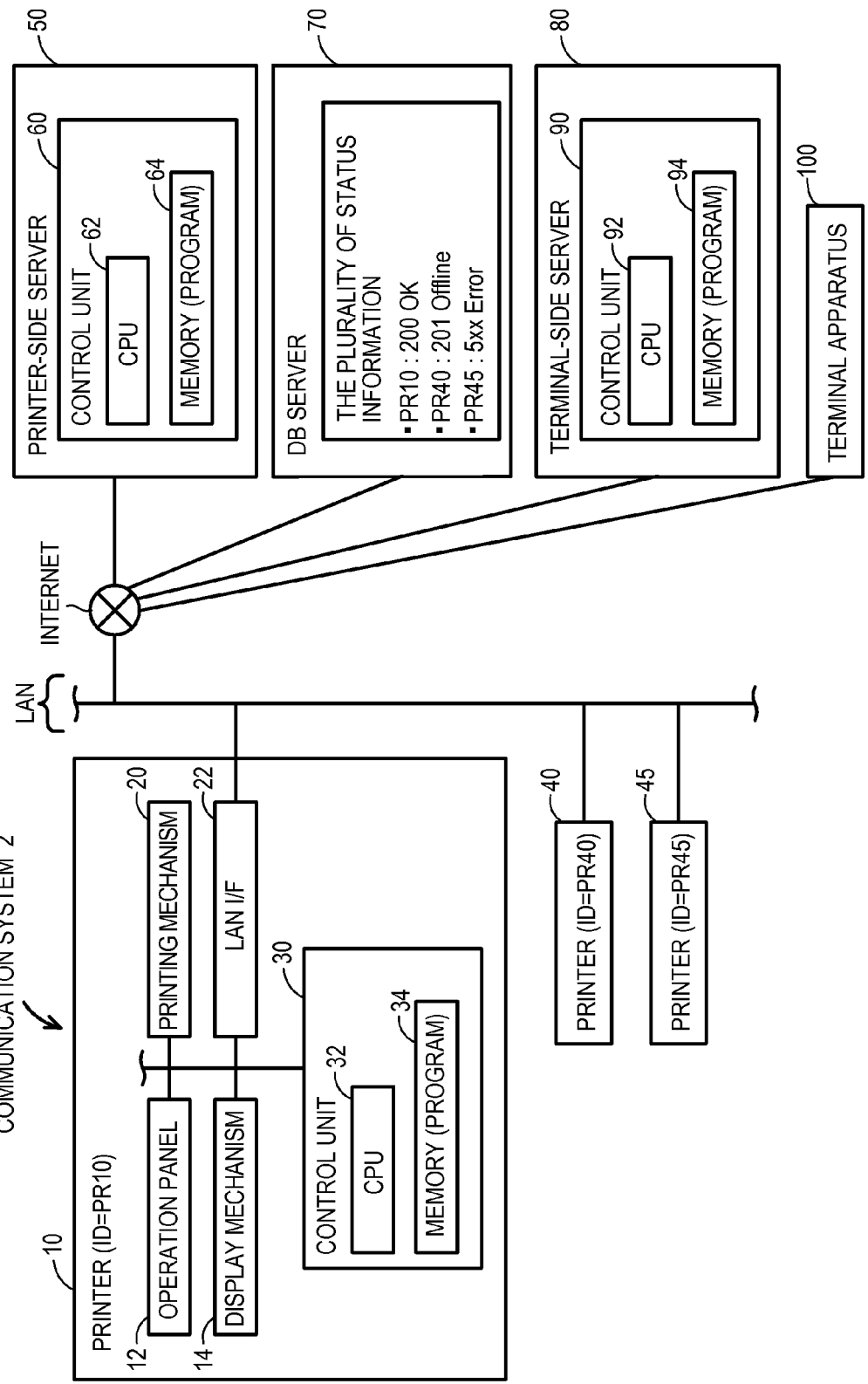
FIG. 1 shows a configuration of a communication system.

As shown in FIG. 1, a communication system 2 includes a plurality of printers 10, 40, 45, a printer-side server 50, a DB (database) server 70, a terminal-side server 80 and a terminal apparatus 100. The respective printers 10, 40, 45 are connected to a LAN (Local Area Network), and the respective servers 50, 70, 80 and the terminal apparatus 100 are connected to the Internet.

Although specifically described later, in the communication system 2, a Subscribe command of an HTTP (Hyper Text Transfer Protocol) is transmitted from a terminal apparatus 100 to the respective printers 10, 40, 45 through the terminal-side server 80 and the printer-side server 50. The respective printers 10, 40, 45 transmit target data, which is indicated by the Subscribe command, to the terminal apparatus 100 at timing that is indicated by the Subscribe command. In order to implement the communication of the Subscribe command and the communication of the target data, the respective device 10 and the like have following configurations. In the below, the Subscribe command is referred to as 'SUB command'.

(Configuration of Printers 10, 40, 45)

The respective printers 10, 40, 45 are peripheral devices (i.e., peripheral devices of a PC (Personal Computer)) that can execute a printing function. The respective printers 10, 40, 45 have 'PR10', 'PR40' and 'PR45', as printer IDs. The printer ID is a unique ID that is allotted by a vendor of the printer 10 and the like. Since the respective printers 10, 40, 45 have the same configuration, a configuration of the printer 10 will be specifically described in the below and the descriptions of the configuration of the printers 40, 45 will be omitted.

The printer 10 has an operation panel 12, a display mechanism 14, a printing mechanism 20, a LAN interface 22 and a control unit 30. The respective units 12 to 30 are connected to a bus line (a reference numeral thereof is omitted). In the below, the interface is referred to as 'I/F'.

The operation panel 12 has a plurality of keys. A user can input a variety of instructions to the printer 10 by operating the operation panel 12. The display mechanism 14 is a display for displaying a variety of information. The printing mechanism 20 is a printing mechanism of an inkjet type, a laser type or the like. The LAN I/F 22 is an I/F for connection to the LAN. In the meantime, the LAN may be a wired LAN or wireless LAN.

The control unit 30 has a CPU 32 and a memory 34. The CPU 32 executes a variety of processing in accordance with programs stored in the memory 34.

(Configurations of Respective Servers 50, 70, 80)

The respective servers 50, 70, 80 are separately configured. The respective servers 50, 70, 80 are servers that are established on the Internet by the vendor of the printers 10, 40, 45. When the terminal-side server 80 receives the SUB command (more specifically, a request command that will be described later) from the terminal apparatus 100, the terminal-side server transmits the SUB command to the printer-side server 50. When the printer-side server 50 receives the SUB command from the terminal-side server 80, the printer-side server transmits the SUB command to the printer 10 and the like.

As described above, the terminal-side server 80 relays the communication of the SUB command from the terminal apparatus 100 to the printer-side server 50, and the printer-side server 50 relays the communication of the SUB command from the terminal-side server 80 to the printer 10 and the like. Accordingly, it can be said that the two servers 50, 80 are servers relaying the communication of the SUB command from the terminal apparatus 100 to the printer 10 and the like.

In the meantime, the printer-side server 50 relays the communication of the SUB command from the terminal-side server 80 to the printer 10 and the like and can provide a variety of services to the printer 10 and the like in response to a request from the printer 10 and the like. The services include (1) a service for transmitting data, which should be used (for example, displayed and printed) in the printer 10 and the like, to the printer 10 and the like, (2) a service for receiving data from a cloud server and transmitting the data to the printer 10 and the like, (3) a service for receiving data from the printer 10 and the like and transmitting the data to the cloud server, and the like.

Like this, since the printer-side server 50 should execute the various processing, the two servers (i.e., the printer-side server 50 and the terminal-side server 80) that are separately configured are provided, in this illustrative embodiment. Thereby, compared to a configuration where the terminal-side server 80 is not provided, it is possible to reduce a processing load of the printer-side server 50. As a result, the printer-side server 50 can appropriately execute the respective processing including the above services.

The printer-side server 50 has a control unit 60. The control unit 60 has a CPU 62 and a memory 64. The CPU 62 executes a variety of processing in accordance with programs stored in the memory 64.

The terminal-side server 80 has a control unit 90. The control unit 90 has a CPU 92 and a memory 94. The CPU 92 executes a variety of processing in accordance with programs stored in the memory 94.

The DB server 70 has a database that is used by the terminal-side server 80. The DB server 70 can store a plurality of status information, in response to an instruction from the terminal-side server 80. The status information includes a printer ID and a code indicative of a status of transmission of the SUB command to a printer corresponding to the printer ID. As an example of the code, '200OK', '201Offline', '202Accepted', '5xxError' of and the like may be exemplified.

'200OK' is a code indicating that the transmission of the SUB command is completed. '201Offline' is a code indicating that the transmission of the SUB command is not completed because XMPP (eXtendible Messaging and Presence Protocol) connection (which will be described later) is not established between the printer 10 and the like and the printer-side server 50. '202Accepted' is a code indicating that the transmission of the SUB command is not completed because processing relating to the transmission of the SUB command is being executed. '5xxError' is a code indicating that the transmission of the SUB command is not completed because a trouble occurs in the printer-side server 50.

(Configuration of Terminal Apparatus 100)

The terminal apparatus 100 is equipped in a store for selling various products (for example, a scanner, a copier, a FAX apparatus, a multi-functional device and the like) that is manufactured by the vendor of the printer 10 and the like. The terminal apparatus 100 is a computer (for example, a PC) having a well-known OS, and has an application (hereinafter, referred to as 'managing application') that is provided by the vendor of the printer 10 and the like. The managing application is a program for executing processing for communicating a variety of commands and the like with the terminal-side server 80.

(Processing that is Executed by Respective Devices 10 and the Like; FIGS. 2 to 6)

Subsequently, processing that is executed by the respective devices is described with reference to FIGS. 2 to 6. In the meantime, since the processing relating to the printer 10 is executed by the CPU 32 of the printer 10, it should be correctly described that the 'CPU 32' executes the processing'. However, in the below, it is described that the 'printer 10 executes the processing', so as to easily understand the invention. Likewise, instead of describing that the 'CPU 62 executes the processing', it is described that the 'printer-side server 50 executes the processing', and instead of describing that the 'CPU 92 executes the processing', it is described that the 'terminal-side server 80 executes the processing.'

Figure 2:
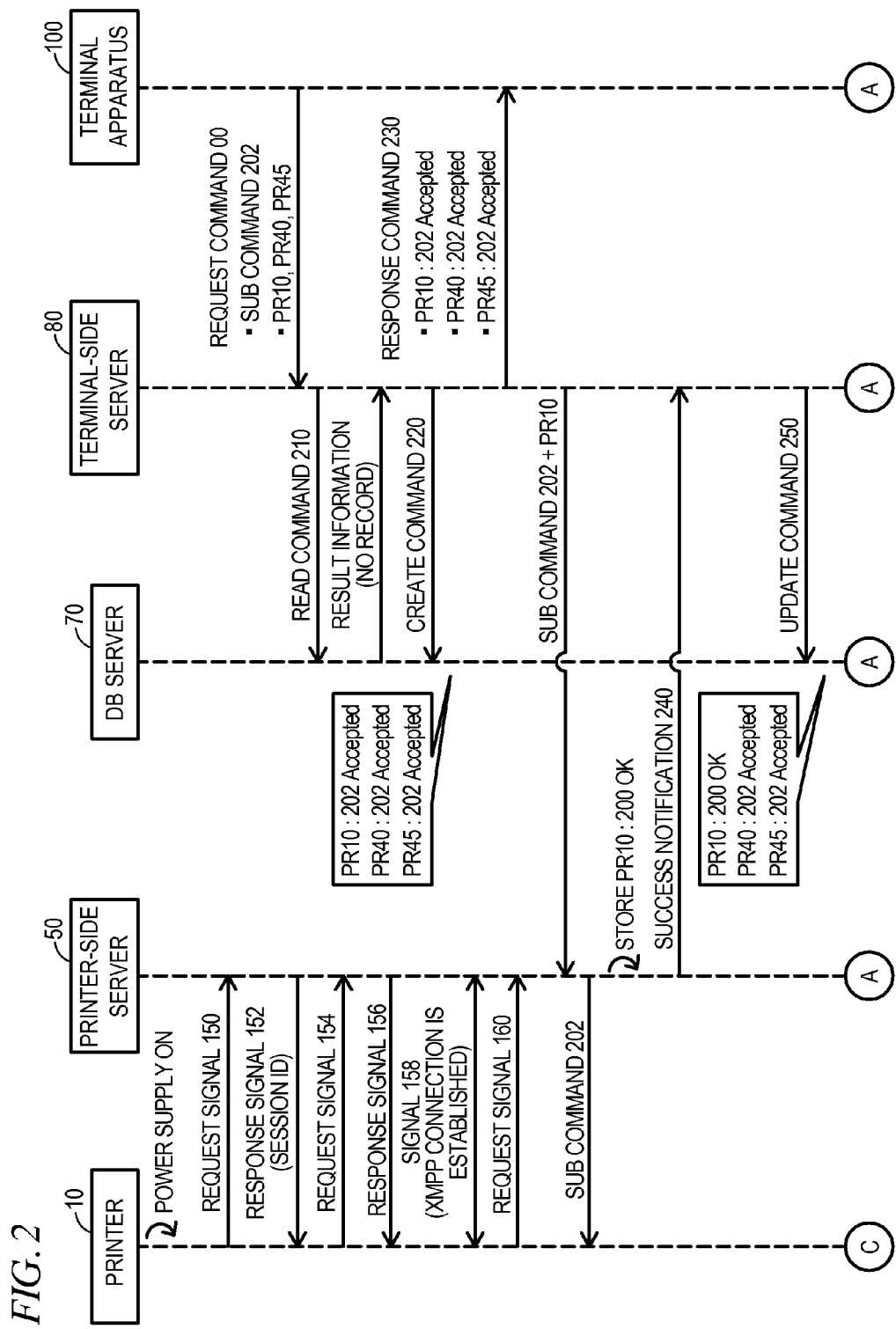
FIG. 2 shows a sequence diagram of respective processing that is executed by each device.

(Sequence Diagram of FIG. 2)

When a user (i.e., an employee of the store) of the terminal apparatus 100 wants to acquire target data relating to the printers 10, 40, 45, the user starts up the managing application of the terminal apparatus 100 and inputs each information for executing transmission of the SUB command to the terminal apparatus 100. In the meantime, as an example of the target data, (1) data indicative of the total number of sheets (i.e., the number of printed sheets) of a printing medium, which was printed in the printer 10 and the like, (2) data indicative of a remaining amount of a disposable (for example, ink, toner and the like) that is used for printing in the printer 10 and the like and (3) data indicative of a hysteresis (i.e., a log) of processing executed in the printer 10 and the like may be exemplified.

Specifically, the user inputs, to the terminal apparatus 100, the printer IDs (i.e., 'PR10', 'PR40' 'and PR45') corresponding to the printers 10, 40, 45, a data ID, which is identification information for identifying the target data and time information indicative of interval time for enabling the respective printers 10, 40, 45 to execute processing of determining whether a value of the target data is changed.

The user can designate arbitrary time, as the time information. When the time indicated by the time information is long, an interval for which the printer 10 and the like execute the processing of determining whether a value of the target data is changed is prolonged, and when the time indicated by the time information is short, the interval for which the printer 10 and the like execute the determination processing is shortened. When it is determined in the determination processing that the value of the target data is changed (for example, the number of printed sheets is changed), the printer 10 and the like transmit a current value of the target data (for example, the current number of printed sheets) to the terminal apparatus 100. When it is determined in the determination processing that the value of the target data is not changed (for example, the number of printed sheets is not changed), the printer 10 and the like do not transmit the current value of the target data. Hence, when the time indicated by the time information is long, a transmission frequency of the target data from the printer 10 and the like is low, and when the time indicated by the time information is short, the transmission frequency of the target data from the printer 10 and the like is high.

In the meantime, when 'zero (0)' is designated as the time information, the printer 10 and the like always execute the determination processing. That is, whenever the value of the target data is changed (for example, whenever the number of printed sheets is changed), the printer 10 and the like transmit the current value of the target data to the terminal apparatus 100.

When the respective information (i.e., the printer ID, the data ID and the time information) is input by the user, the terminal apparatus 100 generates a SUB command 202 of the HTTP including the data ID and time information. The terminal apparatus 100 further generates a request command 200 including the SUB command 202 and the printer IDs. Then, the terminal apparatus 100 transmits the request command 200 to the terminal-side server 80.

When the terminal-side server 80 receives the request command 200 from the terminal apparatus 100, the terminal-side server extracts the printer IDs from the request command 200 and generates a READ command 210 including the extracted printer IDs. Then, the terminal-side server 80 transmits the READ command 210 to the DB server 70. The READ command is a command to request the DB server 70 to transmit the situation information corresponding to the printer ID included in the READ command.

When the DB server 70 receives the READ command 210 from the terminal-side server 80, the DB server determines whether the plurality of situation information corresponding to the printer IDs included in the READ command 210 is stored. At the current moment, the DB server 70 determines that the situation information is not stored, and transmits result information, which indicates that the situation information is not stored, to the terminal-side server 80.

When the terminal-side server 80 receives the result information from the DB server 70, the terminal-side server can know that the situation information is not stored. In this case, the terminal-side server 80 generates a CREATE command 220 including the extracted printer IDs. Then, the terminal-side server 80 transmits the CREATE command 220 to the DB server 70. The CREATE command is a command to request the DB server 70 to generate the situation information corresponding to the printer IDs included in the CREATE command.

When the DB server 70 receives the CREATE command 220 from the terminal-side server 80, the DB server generates a plurality of situation information corresponding to the printer IDs included in the CREATE command 220 and stores the plurality of situation information. Each situation information includes the printer ID (for example, 'PR10') and the code '202Accepted'.

When the terminal-side server 80 transmits the CREATE command 220 to the DB server 70, the terminal-side server generates a response command 230, which is a response to the request command 200. The response command 230 includes the plurality of situation information (i.e., the printer ID and the code '202Accepted') coinciding with the plurality of situation information in the DB server 70. Then, the terminal-side server 80 transmits the response command 230 to the terminal apparatus 100.

When the terminal apparatus 100 receives the response command 230 from the terminal-side server 80, the terminal apparatus checks the plurality of situation information in the response command 230. Thereby, the terminal apparatus 100 can know that the processing of transmitting the SUB command to the printers 10, 40, 45 is being executed.

Then, the terminal-side server 80 selects one printer ID 'PR10' from the printer IDs included in the request command 200. Then, the terminal-side server 80 transmits the SUB command 202 included in the request command 200 and the selected printer ID 'PR10' to the printer-side server 50. Thereby, the terminal-side server 80 can provide the SUB command 202 and the printer ID 'PR10' to the printer-side server 50.

The printer-side server 50 receives the SUB command 202 and the printer ID 'PR10' from the terminal-side server 80 and thus acquires the information thereof. In this case, the printer-side server 50 stores the SUB command 202 in the memory 64. Then, the printer-side server 50 determines whether XMPP connection is established between the printer 10 corresponding to the received printer ID 'PR10' and the printer-side server 50. More specifically, the memory 64 (refer to FIG. 1) of the printer-side server 50 stores therein connection information, which indicates whether the XMPP connection is established between the printer corresponding to the printer ID and the printer-side server 50, for each of the printer IDs. The printer-side server 50 reads out the connection information corresponding to the received printer ID 'PR10' from the memory 64 and determines whether the XMPP connection is established between the printer 10 and the printer-side server 50. In a case of FIG. 2, the printer-side server 50 determines that the XMPP connection is established.

The LAN to which the respective printers 10, 40, 45 are connected has a NAT (Network Address Translation) router for relaying Internet communication. The NAT router permits transmission of data (for example, the SUB command 202) to the LAN (i.e., the printer 10) from the Internet (i.e., the printer-side server 50) at a state where the XMPP connection (i.e., so-called always-on connection) is established between the printer 10 and the printer-side server 50 but prohibits the transmission of the data at a state where the XMPP connection is not established.

Here, a sequence for establishing the XMPP connection between the printer 10 and the printer-side server 50 is described. When a power supply of the printer 10 is changed from an OFF state to an ON state, the printer 10 transmits a request signal of a BOSH (Bidirectional-streams Over Synchronous HTTP) (i.e., HTTP request) 150 to the printer-side server 50. The request signal 150 is a signal for requesting the printer-side server 50 to transmit a session ID that is to be used for the XMPP connection.

In the meantime, the printer 10 may transmit the request signal 150 to the printer-side server 50 not only when the power supply of the printer 10 is changed from an OFF state to an ON state but in a following situation. For example, when a state of a communication link of the printer 10 is changed from a link down state to a link up state, the printer 10 may transmit the request signal 150 to the printer-side server 50. As an example of the link down state, a state where a cable is not inserted in the LAN OF 22, a state where a function of the LAN OF 22 is disabled by a user, and the like may be exemplified. As an example of the link up state, a state where a cable is inserted in the LAN OF 22, a state where a function of the LAN OF 22 is enabled by a user, and the like may be exemplified. Also, when a communication setting of the printer 10 is changed from a setting of prohibiting the Internet communication to a setting of permitting the Internet communication, the printer 10 may transmit the request signal 150 to the printer-side server 50. That is, generally speaking, the printer 10 may transmit the request signal 150 to the printer-side server 50 at a state where the XMPP connection is established.

When the printer-side server 50 receives the request signal 150 from the printer 10, the printer-side server generates a session ID and transmits a response signal (i.e., HTTP response) 152 including the session ID to the printer 10.

When the printer 10 receives the response signal 152 from the printer-side server 50, the printer transmits a request signal of the BOSH (i.e., HTTP request) 154 to the printer-side server 50. The request signal 154 includes a session ID coinciding with the session ID included in the response signal 152. The request signal 154 is a signal for requesting the printer-side server 50 to establish the XMPP connection.

When the printer-side server 50 receives the request signal 154 including the session ID from the printer 10, the printer-side server transmits a response signal (i.e., HTTP response) 156 indicating an OK to the printer 10. Thereby, the printer 10 and the printer-side server 50 establishes the MXPP connection by performing communication of various signals 158 such as an authentication signal, a response signal and the like for establishing the MXPP connection.

In the meantime, although the sequence of establishing the MXPP connection between the printer 10 and the printer-side server 50 has been described, the sequence is also the same for the other printers 40, 45. In the below, the descriptions of the XMPP connection relating to the other printers 40, 45 are omitted.

When the XMPP connection is established, the printer 10 transmits a request signal of the BOSH (i.e., HTTP request) 160 to the printer-side server 50. The request signal 160 includes the session ID. The request signal 160 is a signal becoming a source for transmitting data (for example, the SUB command 202 that will be described later) from the printer-side server 50 to the printer 10.

When there is a SUB command to be transmitted to the printer 10 upon reception of the request signal 160 from the printer 10, the printer-side server 50 transmits the SUB command to the printer 10, as a response signal (i.e., HTTP response) to the request signal 160. At this time, like the case shown in FIG. 2, when a SUB command to be transmitted to the printer 10 does not exist upon the reception of the request signal 160 from the printer 10, the printer-side server 50 does not transmit the SUB command 202 to the printer 10 until the SUB command 202 is received from the terminal-side server 80.

The request signal 160 of the BOSH has long timeout time, compared to a usual request signal of the HTTP, not the BOSH. Hence, even when it takes time to transmit the SUB command 202 after the request signal 160 is received from the printer 10, the printer-side server 50 does not determine that time is up and can appropriately transmit the SUB command 202, as a response signal to the request signal 160. Also, when executing the transmission of the request signal 160 of the BOSH from the printer 10 to the printer-side server 50, the NAT router can appropriately transmit the SUB command 202 (i.e., permits the transmission of the SUB command 202) to the printer 10 without determining that time is up even when it takes time to receive the SUB command 202 (i.e., the response signal) from the printer-side server 50 after the transmission of the request signal 160 is executed.

Also, when the printer 10 receives the response signal (i.e., the SUB command 202) to the request signal 160, the printer again transmits the request signal 160 to the printer-side server 50. That is, whenever the printer 10 receives the response signal to the request signal 160, the printer transmits the request signal 160 to the printer-side server 50. Also, when a predetermined time period elapses without receiving the response signal from the printer-side server 50 after the request signal 160 is transmitted to the printer-side server 50, the printer 10 again transmits the request signal 160 to the printer-side server 50. According to this configuration, the printer-side server 50 always receives the request signal 160 from the printer 10. For this reason, the printer-side server 50 can transmit the desired data (for example, the SUB command) to the printer 10, as a response signal to the request signal 160, at any timing. That is, it can be said that the always-on connection is established between the printer 10 and the printer-side server 50. In the meantime, the predetermined time period is a short time period, compared to the timeout time corresponding to the request signal 160 of the BOSH.

As described above, when it is determined that the XMPP connection is established between the printer 10 and the printer-side server 50, the printer-side server 50 transmits the SUB command 202 to the printer 10, as a response signal to the request signal 160. In the meantime, the response signal does not include the session ID. Since the response signal (i.e., the SUB command 202) is a response signal to the request signal 160 including the session ID (i.e., the request signal 160 that is communicated using the XMPP connection), it can be said that the response signal is a signal that is communicated using the XMPP connection.

When the printer 10 receives the SUB command 202 from the printer-side server 50, the printer determines whether the value of the target data (for example, the number of printed sheets, a remaining amount of the disposable and the like), which is identified by the data ID included in the SUB command 202, is changed, whenever the time indicated by the time information included in the SUB command 202 elapses. When it is determined in the determination processing that the value of the target data is changed, the printer 10 transmits the current value of the target data to the terminal apparatus 100. Thereby, the user (i.e. the employee of the store) of the terminal apparatus 100 can know the current value of the target data of the printer 10 and it is possible to provide the user with a service relating to the current value (for example, a replenishing service of the printing sheets, a replacement service of the disposable and the like).

In the meantime, the printer 10 may transmit the target data to the terminal apparatus 100 through the printer-side server 50 and the terminal-side server 80 or transmit the target data to the terminal apparatus 100 without through any server. That is, generally speaking, the printer 10 may transmit the target data to the outside so that the target data is received at the terminal apparatus 100. This is also the same for the printers 40, 45.

Although not shown, when the printer 10 receives the SUB command 202 from the printer-side server 50, the printer transmits a specific request signal (i.e., HTTP request) indicative of the reception of the SUB command 202 to the printer-side server 50. In the meantime, the specific request signal is a usual request signal of the HTTP, not a request signal of the BOSH, and does not include the session ID.

When the printer-side server 50 receives the specific request signal from the printer 10, the printer-side server stores the status information, which is associated with the printer 'ID PR10' of the printer 10 and the code '200OK', in the memory 64. Meanwhile, in this illustrative embodiment, the printer-side server 50 stores the status information in the memory 64 of the printer-side server 50. However, in a modified embodiment, the printer-side server 50 may store the status information in an external memory (i.e., a database) of the printer-side server 50. Then, the printer-side server 50 transmits a success notification 240, which indicates that the transmission of the SUB command to the printer 10 is successful, to the terminal-side server 80. Thereby, the printer-side server 50 can provide the success notification 240 to the terminal-side server 80.

The terminal-side server 80 receives the success notification 240 from the printer-side server 50 and thus acquires the success notification 240. In this case, the terminal-side server 80 generates an UPDATE command 250 including the printer ID 'PR10' and the code '200OK'. Then, the terminal-side server 80 transmits the UPDATE command 250 to the DB server 70. The UPDATE command is a command to request the DB server 70 to update the situation information, which corresponds to the printer ID included in the UPDATE command, to a content indicated by the code included in the UPDATE command.

When the DB server 70 receives the UPDATE command 250 from the terminal-side server 80, the DB server updates the situation information, which corresponds to the printer ID 'PR10' included in the UPDATE command 250, to the code (i.e., '200OK') included in the UPDATE command 250.

Figure 3:
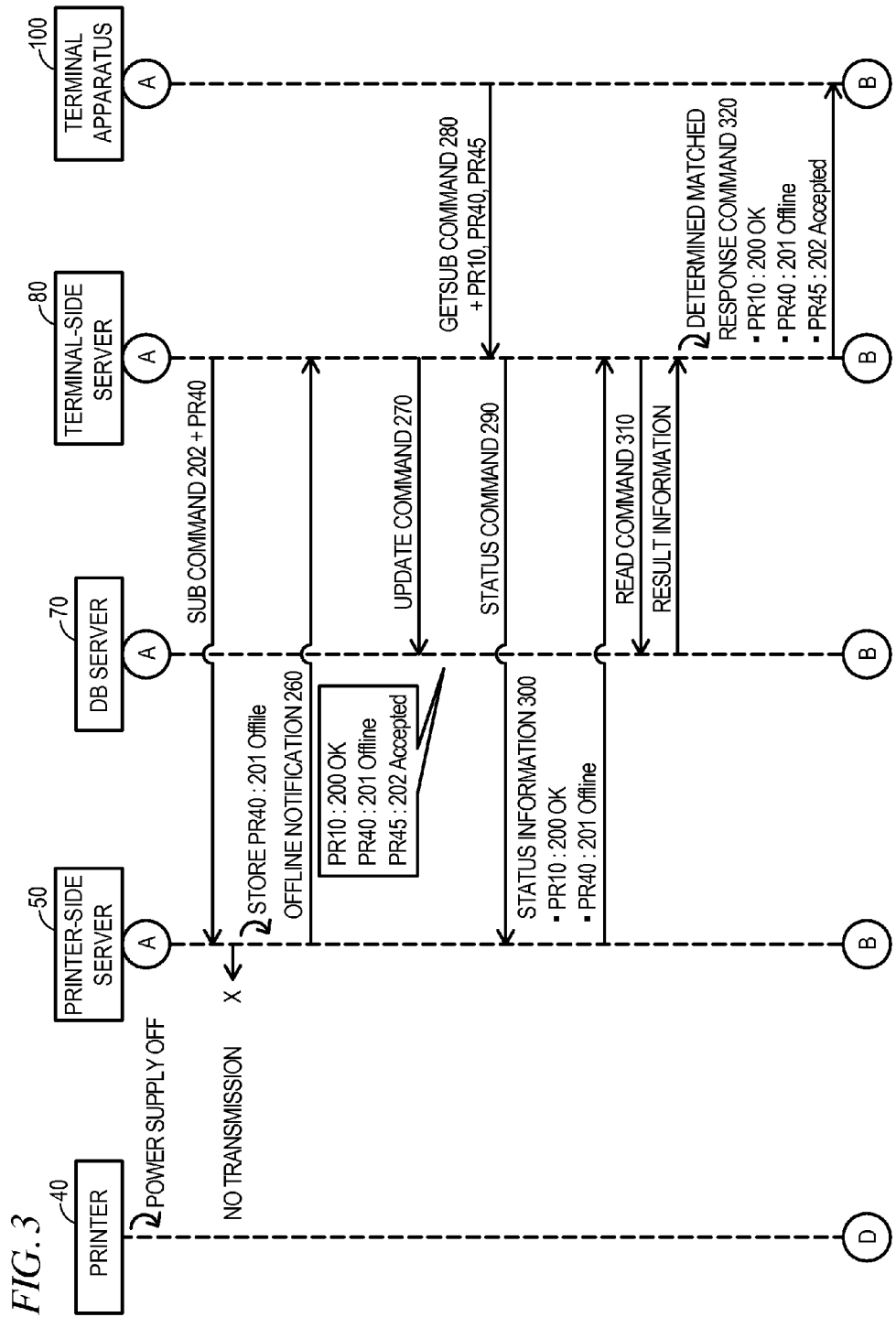
FIG. 3 is a sequence diagram following FIG. 2.

(Sequence Diagram of FIG. 3)

As shown in FIG. 3, since the power supply of the printer 40 is off, the XMPP connection is not established between the printer 40 and the printer-side server 50. For this reason, the memory 64 of the printer-side server 50 stores therein the connection information, which indicates that the XMPP connection is not established, in association with the printer ID 'PR40' of the printer 40.

The terminal-side server 80 selects one printer ID 'PR40' from the printer IDs included in the request command 200. Then, the terminal-side server 80 transmits the SUB command 202 included in the request command 200 and the selected printer ID 'PR40' to the printer-side server 50.

When the printer-side server 50 receives the SUB command 202 and the printer ID 'PR40' from the terminal-side server 80, the printer-side server reads out the connection information corresponding to the printer ID 'PR40' from the memory 64 and determines that the XMPP connection is not established between the printer 40 and the printer-side server 50. In this case, the printer-side server 50 does not execute the processing for transmitting the SUB command 202 to the printer 40.

Then, the printer-side server 50 stores the status information, which is associated with the printer ID 'PR40' of the printer 40 and the code '202Offline', in the memory 64. Then, the printer-side server 50 transmits an Offline notification 260, which indicates that the SUB command cannot be transmitted because the XMPP connection is not established between the printer 40 and the printer-side server 50, to the terminal-side server 80.

When the terminal-side server 80 receives the Offline notification 260 from the printer-side server 50, the terminal-side server generates an UPDATE command 270 including the printer ID 'PR40' and the code '201Offline'. Then, the terminal-side server 80 transmits the UPDATE command 270 to the DB server 70.

When the DB server 70 receives the UPDATE command 270 from the terminal-side server 80, the DB server updates the situation information, which corresponds to the printer ID 'PR40' included in the UPDATE command 270, to the code (i.e., '201Offline') included in the UPDATE command 270.

As described above, in this illustrative embodiment, the terminal-side server 80 first transmits the one printer ID 'PR10' of the printer IDs included in the request command 200 and the SUB command 202 to the printer-side server 50 (refer to FIG. 2). After that, when the terminal-side server 80 receives the success notification 240 from the printer-side server 50, the terminal-side server transmits another printer ID 'PR40' of the printer IDs included in the request command 200 and the SUB command 202 to the printer-side server 50.

Instead of the above configuration, a configuration (hereinafter, referred to as 'a configuration of a first comparative example') is considered in which the terminal-side server 80 transmits all the printer IDs included in the request command 200 and the SUB command 202 to the printer-side server 50 at the same time. However, according to the configuration of the first comparative example, the printer-side server 50 should sequentially execute the processing for transmitting the SUB command 202 to each of the printers 10, 40, 45 at a state where all the printer IDs are stored in a work memory of the memory 64. For this reason, a resource (i.e., the memory 64) load of the printer-side server 50 is large. When the resource load of the printer-side server 50 becomes large, there is a possibility that the printer-side server 50 will not be able to appropriately execute the processing including the above services.

In contrast, according to this illustrative embodiment, the printer-side server 50 has only to execute the processing for transmitting the SUB command to the one printer corresponding to the one printer ID. For this reason, it is possible to suppress a data amount to be stored in the work memory of the memory 64 from being increased, so that the resource load of the printer-side server 50 becomes small. As a result, the printer-side server 50 can appropriately execute the processing including the above services.

As described above, since the terminal apparatus 100 receives the response command 230 (refer to FIG. 2) from the terminal-side server 80, the terminal apparatus can know that the processing of transmitting the SUB command to the respective printers 10, 40, 45 is being executed. At this time, since the terminal apparatus 100 has not confirmed yet that the transmission of the SUB command is completed, the terminal apparatus transmits a GETSubscription command 280, which is a command of the HTTP for the confirmation, and the printer IDs (i.e., 'PR10', 'PR40' and 'PR45') to the terminal-side server 80.

In the below, the GETSubscription command is referred to as 'GETSUB command'. In this illustrative embodiment, the terminal apparatus 100 transmits the GETSUB command 280 every predetermined time period (i.e., periodically). In a modified embodiment, the terminal apparatus 100 may transmit the GETSUB command 280 when the user (i.e., the employee of the store) inputs a predetermined instruction to the terminal apparatus 100.

When the terminal-side server 80 receives the GETSUB command 280 and the printer IDs from the terminal apparatus 100, the terminal-side server generates a status command 290 including the printer IDs. Then, the terminal-side server 80 transmits the status command 290 to the printer-side server 50. The status command is a command to request the printer-side server 50 to transmit the status information corresponding to the printer IDs included in the status command.

When the printer-side server 50 receives the status command 290 from the terminal-side server 80, the printer-side server reads out status information 300 from the memory 64. At the current moment, the memory 64 stores therein first status information (refer to FIG. 2) including the printer ID 'PR10' and the code '200OK' and second status information (refer to FIG. 3) including the printer ID 'PR40' and the code '201Offline'. Hence, the printer-side server 50 reads out the status information 300 including the first and second status information from the memory 64. Then, the printer-side server 50 transmits the status information 300 to the terminal-side server 80.

When the terminal-side server 80 receives the status information 300 from the printer-side server 50, the terminal-side server 80 generates a READ command 310 including the printer IDs. Then, the terminal-side server 80 transmits the READ command 310 to the DB server 70.

When the DB server 70 receives the READ command 310 from the terminal-side server 80, the DB server reads out a plurality of situation information corresponding to the printer IDs included in the READ command 310. The plurality of read situation information includes first situation information including the printer ID 'PR10' and the code '200OK', second situation information including the printer ID 'PR40' and the code '201Offline' and third situation information including the printer ID 'PR45' and the code '202Accepted'. The DB server 70 transmits result information including the plurality of situation information to the terminal-side server 80.

When the terminal-side server 80 receives the result information from the DB server 70, the terminal-side server compares the plurality of situation information included in the result information and the status information 300 and determines whether the contents thereof are matched. At the current moment, the first status information ('PR10' and '200OK') included in the status information 300 and the first situation information ('PR10' and '200OK') included in the result information are matched. Also, the second status information ('PR40' and '201Offline') included in the status information 300 and the second situation information ('PR40' and '201Offline') included in the result information are matched. Hence, the terminal-side server 80 determines that the contents are matched.

In the meantime, since the status information 300 does not include the status information corresponding to the printer ID 'PR45', there is no status information that is to be compared with the third situation information ('PR45' and '202Accepted') included in the result information. In this case, the terminal-side server 80 determines that the contents are matched. When it is determined that the contents are matched, the terminal-side server 80 does not update the situation information in the DB server 70.

Then, the terminal-side server 80 generates a response command 320, which is a response to the GETSUB command 280. The response command 320 includes a plurality of situation information coinciding with the plurality of situation information in the DB server 70. Then, the terminal-side server 80 transmits the response command 320 to the terminal apparatus 100.

When the terminal apparatus 100 receives the response command 320 from the terminal-side server 80, the terminal apparatus checks the plurality of situation information in the response command 320. Thereby, the terminal apparatus 100 can know (1) that the transmission of the SUB command to the printer 10 is completed, (2) that the transmission of the SUB command to the printer 40 is not completed because the XMPP connection is not established and (3) that the transmission of the SUB command to the printer 45 is not completed because the processing of transmitting the SUB command is being executed.

Figure 4:
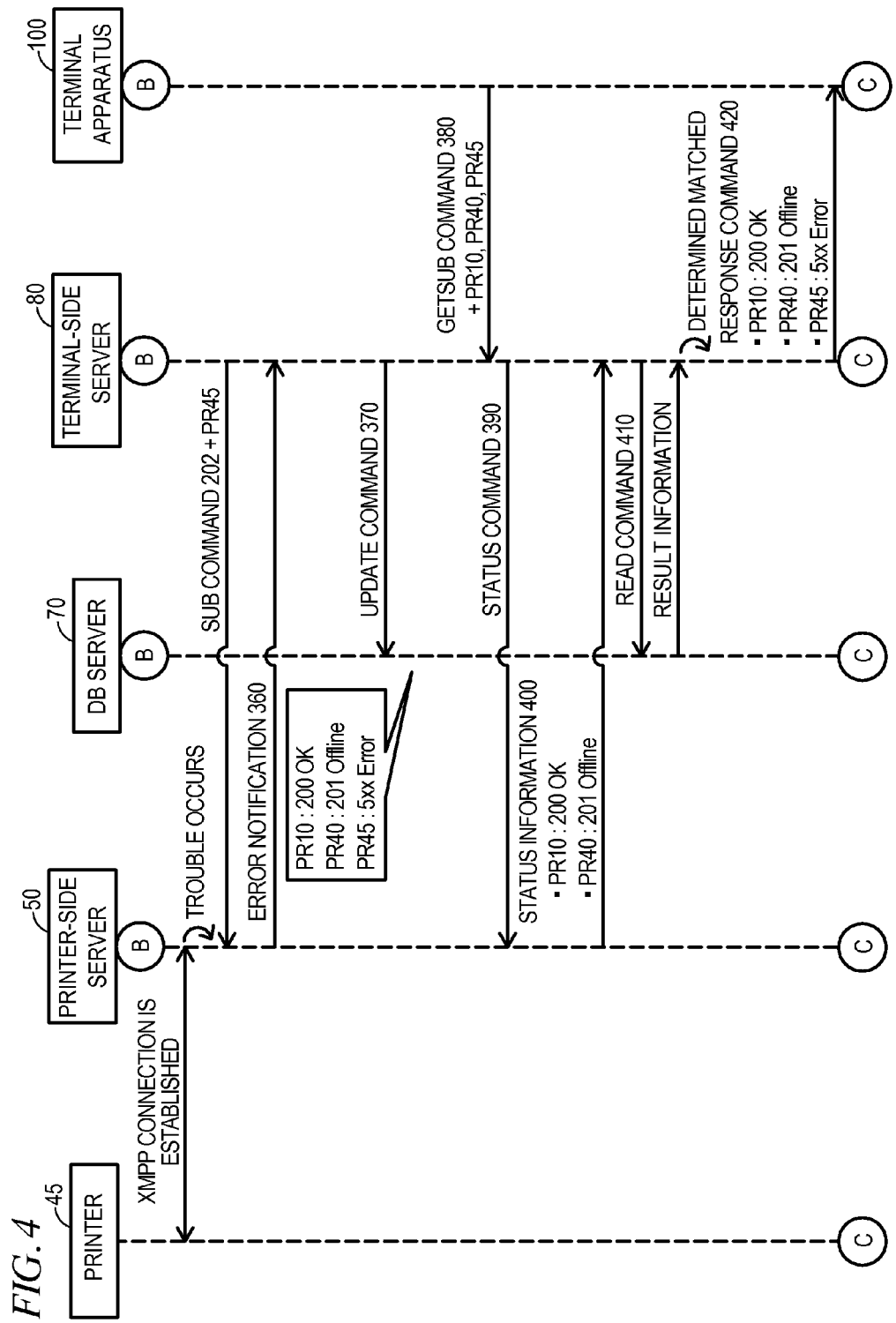
FIG. 4 is a sequence diagram following FIG. 3.

(Sequence Diagram of FIG. 4)

As shown in FIG. 4, a situation is assumed in which the XMPP connection is established between the printer 45 and the printer-side server 50 but a trouble (for example, a freeze of the printer-side server 50) occurs in the printer-side server 50.

The terminal-side server 80 selects one printer ID 'PR45' from the plurality of printer IDs included in the request command 200. Then, the terminal-side server 80 transmits the SUB command 202 included in the request command 200 and the selected printer ID 'PR45' to the printer-side server 50.

Since a trouble occurs in the printer-side server 50, the printer-side server 50 cannot execute the processing for transmitting the SUB command 202 to the printer 45 even when it receives the SUB command 202 from the terminal-side server 80. Hence, the printer-side server 50 transmits an error notification 360, which indicates that the processing cannot be executed, to the terminal-side server 80. In the meantime, since the trouble occurs in the printer-side server 50, the printer-side server 50 cannot store the status information in the memory 64.

When the terminal-side server 80 receives the error notification 360 from the printer-side server 50, the terminal-side server generates an UPDATE command 370 including the printer ID 'PR45' and the code '5xxError'. Then, the terminal-side server 80 transmits the UPDATE command 370 to the DB server 70.

In a modified embodiment, the printer-side server 50 may not transmit the UPDATE command 370. In this case, when predetermined timeout time elapses without receiving a notification from the printer-side server 50, the terminal-side server 80 may determine that a trouble has occurred in the printer-side server 50. When it is determined that a trouble has occurred in the printer-side server 50, the terminal-side server 80 may transmit the UPDATE command 370 including the printer ID 'PR45' and the code '5xxError' to the DB server 70.

When the DB server 70 receives the UPDATE command 370 from the terminal-side server 80, the DB server updates the situation information, which corresponds to the printer ID 'PR45' included in the UPDATE command 370, to the code (i.e., '5xxError') included in the UPDATE command 370.

On the other hand, the terminal apparatus 100 can know that the transmission of the SUB command to the printers 40, 45 is not completed, at the steps of transmitting the GETSUB command 280 and receiving the response command 320 of FIG. 3. For this reason, the terminal apparatus 100 again transmits a GETSUB command 380 and the plurality of printer IDs (i.e., 'PR10', 'PR40' and 'PR45') to the terminal-side server 80 after a predetermined time period has elapsed from the transmission of the GETSUB command 280.

When the terminal-side server 80 receives the GETSUB command 380 and the plurality of printer IDs from the terminal apparatus 100, the terminal-side server generates a status command 390 including the printer IDs. Then, the terminal-side server 80 transmits the status command 390 to the printer-side server 50.

When the printer-side server 50 receives the status command 390 from the terminal-side server 80, the printer-side server reads out status information 400 from the memory 64. The status information 400 includes the first status information ('PR10' and '200OK') and the second status information ('PR40' and '201Offline'). Then, the printer-side server 50 transmits the status information 400 to the terminal-side server 80.

The respective processing thereafter, i.e., the communication of a READ command 410, the communication of result information and the comparison of the result information and the status information 400 are the same as those of FIG. 3. At the current moment, the terminal-side server 80 determines that the contents are matched. Then, the terminal-side server 80 generates a response command 420, which is a response to the GETSUB command 380, and transmits the response command 420 to the terminal apparatus 100. In the response command 320 of FIG. 3, the third situation information includes 'PR45' and the code '201Accepted'. However, in the response command 420 of FIG. 4, the third situation information includes 'PR45' and the code '5xxError'.

When the terminal apparatus 100 receives the response command 420 from the terminal-side server 80, the terminal apparatus checks the plurality of situation information in the response command 420. Unlike the case of FIG. 3, the terminal apparatus 100 can know that the transmission of the SUB command to the printer 45 is not completed because the trouble occurs in the printer-side server 50.

Figure 5:
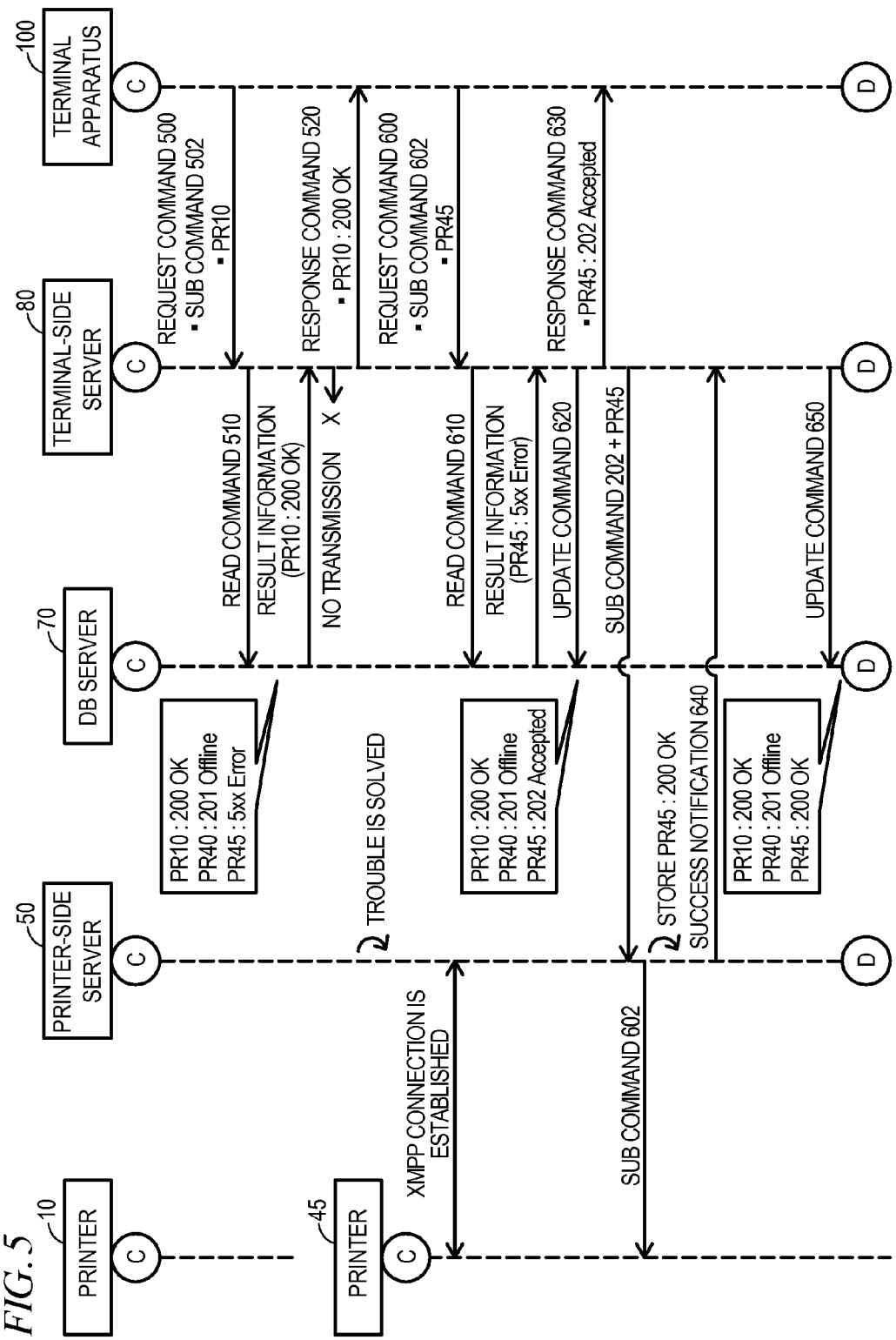
FIG. 5 is a sequence diagram following FIG. 4.

(Sequence Diagram of FIG. 5)

A situation is assumed in which even though the transmission of the SUB command 202 (refer to FIG. 2) to the printer 10 has been executed, the user of the terminal apparatus 100 misunderstands that the transmission of the SUB command 202 to the printer 10 has not been executed. In this case, the user can again input the respective information for executing the transmission of the SUB command 202 to the printer 10 to the terminal apparatus 100. That is, the user can input the printer ID 'PR10' corresponding to the printer 10, data ID (for example, data ID different from the data ID included in the SUB command 202) and the time information to the terminal apparatus 100.

When the respective information (i.e., the printer ID, the data ID and the time information) is input by the user, the terminal apparatus 100 generates a SUB command 502. The terminal apparatus 100 further generates a request command 500 including the SUB command 502 and the printer ID 'PR10'. Then, the terminal apparatus 100 transmits the request command 500 to the terminal-side server 80.

When the terminal-side server 80 receives the request command 500 from the terminal apparatus 100, the terminal-side server extracts the printer ID 'PR10' from the request command 500 and generates a READ command 510 including the printer ID 'PR10'. Then, the terminal-side server 80 transmits the READ command 510 to the DB server 70.

When the DB server 70 receives the READ command 510 from the terminal-side server 80, the DB server reads out the first situation information (i.e., the printer ID 'PR10' and the code '200OK') corresponding to the printer ID 'PR10' included in the READ command 510. The DB server 70 transmits result information including the first situation information to the terminal-side server 80.

When the terminal-side server 80 receives the result information from the DB server 70, the terminal-side server can know that the transmission of the SUB command 202 (refer to FIG. 2) to the printer 10 is completed. In this case, the terminal-side server 80 does not transmit the SUB command 502 included in the request command 500 to the printer-side server 50. As a result, the SUB command 502 is not transmitted to the printer 10.

In the meantime, the terminal-side server 80 does not transmit the SUB command 502 to the printer-side server 50 not only when the result information received from the DB server 70 includes the code '200OK' but when the result information includes the code '201Offline' or code '202Accepted'.

Like this, in this illustrative embodiment, even when the user erroneously inputs the instruction for transmitting the SUB command 502 to the printer 10 to the terminal apparatus 100, the SUB command 502 is not transmitted to the printer 10. For this reason, the printer 10 can appropriately transmit the target data to the terminal apparatus 100 in accordance with the SUB command 202 (refer to FIG. 2).

In a modified embodiment, the user may input information, which instructs forcible transmission of the SUB command 502 to the printer 10, to the terminal apparatus 100, in addition to the printer ID 'PR10' corresponding to the printer 10, the data ID and the time information. In this case, even when the code included in the first situation information stored in the DB server 70 has any value, the printer-side server 50 may transmit the SUB command 502 to the printer-side server 50. Then, the printer-side server 50 may transmit an UPDATE command including the printer ID 'PR10' and the code '202Accepted' to the DB server 70, so that the code included in the first situation information in the DB server 70 is updated to the code '202Accepted'.

Then, the terminal-side server 80 generates a response command 520, which is a response to the request command 500. The response command 520 includes the situation information (i.e., the printer ID 'PR10' and the code '200OK'). Then, the terminal-side server 80 transmits the response command 520 to the terminal apparatus 100.

The terminal apparatus 100 receives the response command 520 from the terminal-side server 80. As shown in FIG. 2, in the situation where the SUB command 202 is appropriately processed in the terminal-side server 80, the situation information in the response command 230 includes the code '202Accepted'. In this case, the terminal apparatus 100 can know that the processing relating to the SUB command 202 is appropriately being executed. In contrast, in the case of FIG. 5, the situation information in the response command 520 includes the code '200OK'. In this case, the terminal apparatus 100 can know that the transmission of the SUB command 502 to the printer 10 is not executed because the transmission of the SUB command 202 to the printer 10 is completed. In this situation, the terminal apparatus 100 may display a screen, which indicates that the transmission of the SUB command 502 to the printer 10 cannot be executed.

In the meantime, although not shown, regarding a command to invalidate the SUB command 202 that was transmitted to the printer 10 in the past, there is a command (hereinafter, referred to as 'UNSUB command') that is referred to as Unsubscribe. The user can input, to the terminal apparatus 100, an instruction for transmitting the UNSUB command to invalidate the SUB command 202. In this case, the terminal apparatus 100 transmits the UNSUB command to the terminal-side server 80.

When the terminal-side server 80 receives the UNSUB command from the terminal apparatus 100, the terminal-side server transmits a DELETE command to the DB server 70. Thereby, the first situation information corresponding to the printer ID 'PR10' in the DB server 70 is deleted. Also, the terminal-side server 80 transmits the UNSUB command to the printer-side server 50.

When the printer-side server 50 receives the UNSUB command from the terminal-side server 80, the printer-side server deletes the SUB command 202 stored in the memory 64. Then, the printer-side server 50 transmits the UNSUB command to the printer 10. As a result, since the printer 10 invalidates the SUB command 202, the printer does not execute the processing for transmitting the target data to the terminal apparatus 100 in accordance with the SUB command 202.

After the SUB command 202 is invalidated, the processing of transmitting a new SUB command to the printer 10 is appropriately executed. That is, when the user inputs an instruction for transmitting a new SUB command to the printer 10 to the terminal apparatus 100, the SUB command is transmitted to the printer 10 through the terminal-side server 80 and the printer-side server 50. Thereby, the printer 10 executes the processing for transmitting the target data to the terminal apparatus 100 in accordance with the new SUB command.

Although the trouble occurs in the printer-side server 50, as shown in FIG. 4, the trouble is thereafter solved, as shown in FIG. 5. Although the printer-side server 50 receives the SUB command 202 and the printer ID 'PR45' from the terminal-side server 80 while the trouble occurs, it does not store the status information corresponding to the printer ID 'PR45'. For this reason, the printer-side server 50 cannot know that the SUB command 202 and the printer ID 'PR45' have been received in the past. As a result, even when the trouble is solved, the printer-side server does not transmit the SUB command 202 to the printer 45.

After that, the user inputs the respective information (i.e., the printer ID 'PR45', the data ID and the time information) for executing the transmission of the SUB command to the printer 45 to the terminal apparatus 100. When the respective information is input by the user, the terminal apparatus 100 generates a SUB command 602. In addition, the terminal apparatus 100 generates a request command 600 including the SUB command 602 and the printer ID 'PR45'. Then, the terminal apparatus 100 transmits the request command 600 to the terminal-side server 80.

When the terminal-side server 80 receives the request command 600 from the terminal apparatus 100, the terminal-side server extracts the printer ID 'PR45' from the request command 600 and generates a READ command 610 including the printer ID 'PR45'. Then, the terminal-side server 80 transmits the READ command 610 to the DB server 70.

When the DB server 70 receives the READ command 610 from the terminal-side server 80, the DB server reads out the third situation information (i.e., the printer ID 'PR45' and the code '5xxError') corresponding to the printer ID 'PR45' included in the READ command 610. The DB server 70 transmits result information including the third situation information to the terminal-side server 80.

When the terminal-side server 80 receives the result information from the DB server 70, the terminal-side server can know that the transmission of the SUB command to the printer 45 is not completed due to the trouble of the printer-side server 50. In this case, the terminal-side server 80 generates an UPDATE command 620 including the printer ID 'PR45' and the code '202Accepted'. Then, the terminal-side server 80 transmits the UPDATE command 620 to the DB server 70.

When the DB server 70 receives the UPDATE command 620 from the terminal-side server 80, the DB server updates the third situation information, which corresponds to the printer ID 'PR45' included in the UPDATE command 620, to the code (i.e., '202Accepted') included in the UPDATE command 620.

Then, the terminal-side server 80 generates a response command 630, which is a response to the request command 600. The response command 630 includes the situation information (i.e., the printer ID 'PR45' and the code '202Accepted'). Then, the terminal-side server 80 transmits the response command 630 to the terminal apparatus 100.

When the terminal apparatus 100 receives the response command 630 from the terminal-side server 80, the terminal apparatus checks the situation information in the response command 630. Thereby, the terminal apparatus 100 can know that the transmission of the SUB command to the printer 45 is not completed because the processing relating to the transmission of the SUB command to the printer 45 is being executed.

Then, the terminal-side server 80 transmits the SUB command 602 included in the request command 600 and the printer ID 'PR45' to the printer-side server 50.

When the printer-side server 50 receives the SUB command 602 and the printer ID 'PR45' from the terminal-side server 80, the printer-side server determines that the XMPP connection is established between the printer 45 and the printer-side server 50 and transmits the SUB command 602 to the printer 45. Then, the printer-side server 50 stores the status information, which is associated with the printer ID 'PR45' and the code '200OK', in the memory 64.

Then, the printer-side server 50 transmits a success notification 640, which indicates that the transmission of the SUB command 602 to the printer 45 is successful, to the terminal-side server 80. The respective processing thereafter, i.e., the communication of an UPDATE command 650 and the update of the third situation information are the same as those of FIG. 2.

Figure 6:
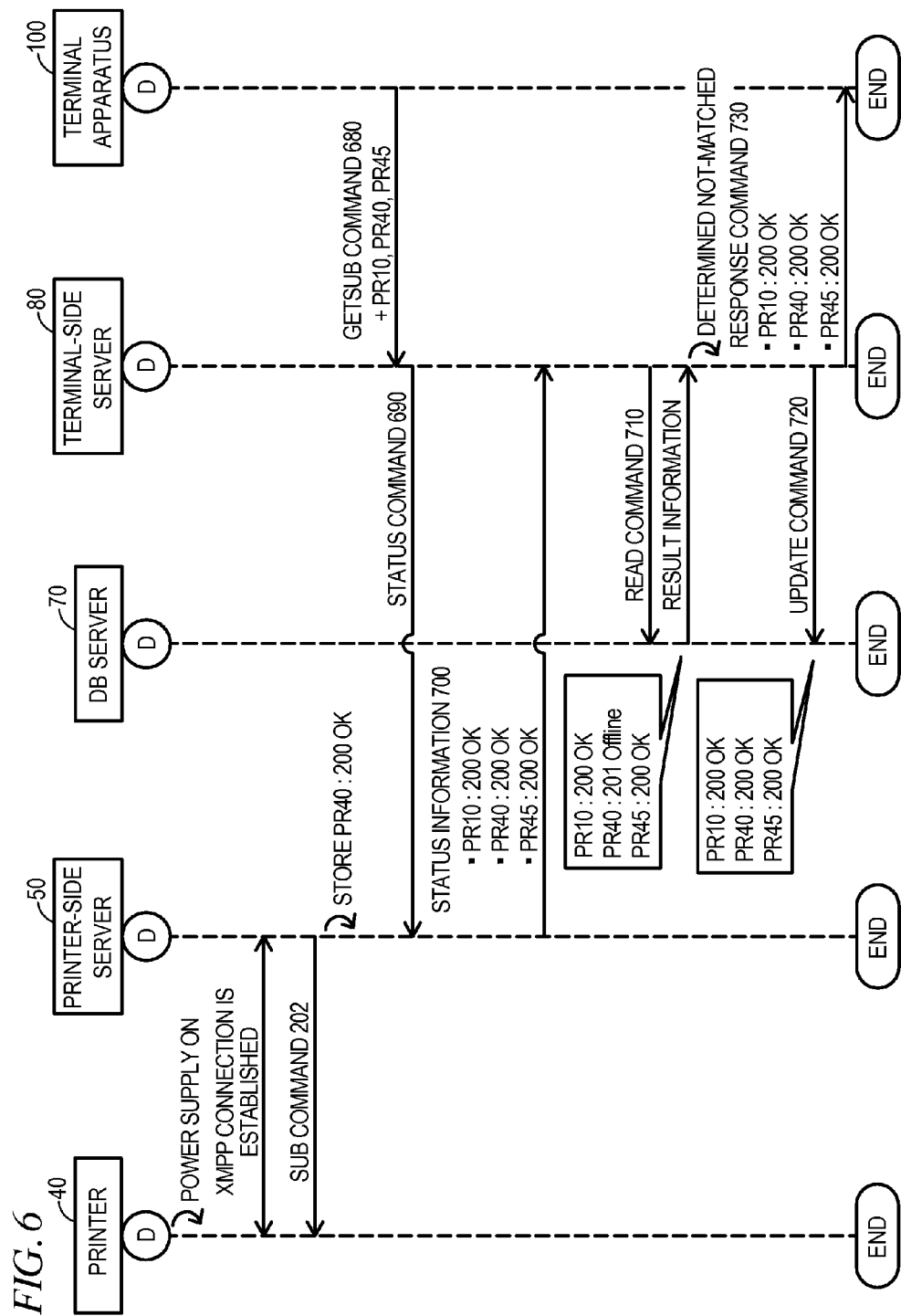
FIG. 6 is a sequence diagram following FIG. 5.

(Sequence Diagram of FIG. 6)

As shown in FIG. 6, since the power supply of the printer 40 is on, the XMPP connection is established between the printer 40 and the printer-side server 50. Upon the reception of the SUB command 202 and the printer ID 'PR40' from the terminal-side server 80, the printer-side server 50 stores therein the status information (code '201Offline') corresponding to the printer ID 'PR40' (refer to FIG. 3). For this reason, the printer-side server 50 can know that the SUB command 202 and the printer ID 'PR40' were received in the past. As a result, when the XMPP connection is established between the printer 40 and the printer-side server 50, the printer-side server transmits the SUB command 202 in the memory 64 to the printer 40.

Then, the printer-side server 50 stores the status information, which is associated with the printer ID 'PR40' and the code '200OK', in the memory 64. At this time, the printer-side server 50 does not transmit the success notification, which indicates that the transmission of the SUB command 202 to the printer 40 is successful, to the terminal-side server 80. For example, in the case of FIG. 2, although the success notification 240 is transmitted to the terminal-side server 80 from the printer-side server 50, the success notification 240 is transmitted as a response to the SUB command 202 and the printer ID 'PR10'. Compared to this, in the case of FIG. 6, since the printer-side server 50 has received the SUB command 202 and the printer ID 'PR40' well in advance (refer to FIG. 3), the printer-side server cannot transmit the success notification, as a response thereto.

Since the success notification is not transmitted from the printer-side server 50 to the terminal-side server 80, the terminal-side server 80 cannot know that the transmission of the SUB command 202 to the printer 40 is completed. As a result, the terminal-side server does not update the second situation information corresponding to the printer ID 'PR40' in the DB server 70.

The terminal apparatus 100 can know that the transmission of the SUB command to the printers 40, 45 is not completed, at the steps of transmitting the GETSUB command 380 and the receiving the response command 420. For this reasons, the terminal apparatus 100 again transmits a GETSUB command 680 and the plurality of printer IDs (i.e., 'PR10', 'PR40' and 'PR45') to the terminal-side server 80.

When the terminal-side server 80 receives the GETSUB command 680 and the printer IDs from the terminal apparatus 100, the terminal-side server generates a status command 690 including the printer IDs. Then, the terminal-side server 80 transmits the status command 690 to the printer-side server 50.

When the printer-side server 50 receives the status command 690 from the terminal-side server 80, the printer-side server reads out status information 700 from the memory 64. At the current moment, the memory 64 stores therein the first status information (refer to FIG. 2) including the printer ID 'PR10' and the code '200OK', the second status information (refer to FIG. 6) including the printer ID 'PR40' and the code '200OK' and the third status information (refer to FIG. 5) including the printer ID 'PR45' and the code '200OK'. Hence, the printer-side server 50 reads out the status information 700 including the first, second and third status information from the memory 64. Then, the printer-side server 50 transmits the status information 700 to the terminal-side server 80.

When the terminal-side server 80 receives the status information 700 from the printer-side server 50, the terminal-side server generates a READ command 710 including the printer IDs. Then, the terminal-side server 80 transmits the READ command 710 to the DB server 70.

When the DB server 70 receives the READ command 710 from the terminal-side server 80, the DB server reads out a plurality of situation information corresponding to the printer IDs included in the READ command 710. The plurality of read situation information includes first situation information including the printer ID 'PR10' and the code '200OK', second situation information including the printer ID 'PR40' and the code '201Offline' and third situation information including the printer ID 'PR45' and the code '200OK'. The DB server 70 transmits result information including the plurality of situation information to the terminal-side server 80.

When the terminal-side server 80 receives the result information from the DB server 70, the terminal-side server compares the plurality of situation information included in the result information and the status information 700. At the current moment, the first and third status information included in the status information 700 are matched with the first and third situation information included in the result information. However, the second status information ('PR40' and '200OK') included in the status information 700 is not matched with the second situation information ('PR40' and '201Offline') included in the result information. Hence, the terminal-side server 80 determines that the contents thereof are not matched.

When it is determined that the contents thereof are not matched, the terminal-side server 80 generates an UPDATE command 720 so that the second situation information in the DB server 70 is updated to the contents indicated by the second status information included in the status information 700. Specifically, the terminal-side server 80 generates an UPDATE command 720 including the printer ID 'PR40' and the code '200OK'. Then, the terminal-side server 80 transmits the UPDATE command 720 to the DB server 70.

When the DB server 70 receives the UPDATE command 720 from the terminal-side server 80, the DB server updates the second situation information, which corresponds to the printer ID 'PR40' included in the UPDATE command 720, to the code (i.e., '200OK') included in the UPDATE command 720. Thereby, the status information 700 stored in the printer-side server 50 can be matched with the situation information stored in the DB server 70.

Then, the terminal-side server 80 generates a response command 730, which is a response to the GETSUB command 680. The response command 730 includes a plurality of situation information (i.e., a plurality of situation information coinciding with the status information 700) coinciding with the plurality of status information in the DB server 70. Then, the terminal-side server 80 transmits the response command 730 to the terminal apparatus 100.

When the terminal apparatus 100 receives the response command 730 from the terminal-side server 80, the terminal apparatus can know that the transmission of the SUB command to all the printers 10, 40, 45 is completed. In this situation, the terminal apparatus 100 does not again transmit the GETSUB command to the terminal-side server 80.

Effects of this Illustrative Embodiment

According to the above illustrative embodiment, when the terminal-side server 80 receives the request command 200 including the SUB command 202 from the terminal apparatus 100, the terminal-side server transmits the response command 230 to the terminal apparatus 100 (refer to FIG. 2), and when the terminal-side server receives the GETSUB command 280, 380, 680 from the terminal apparatus 100, the terminal-side server transmits the response command 320, 420, 730 including the situation information to the terminal apparatus 100 (refer to FIGS. 3, 4 and 6).

For example, a configuration (hereinafter, referred to as 'a configuration of a second comparative example') is considered in which when the transmission of the SUB command 202 to all the printers 10, 40, 45 is completed after the terminal-side server 80 receives the request command 200, a response command to the request command 200 is transmitted to the terminal apparatus 100. However, according to the configuration of the second comparative example, it takes much time from the transmission of the request command 200 to the reception of the response command in the terminal apparatus 100. In this case, the terminal apparatus 100 may determine that the time is up before the response command is received and invalidate the transmission of the request command 200. When the invalidation processing is executed, the terminal apparatus 100 cannot execute appropriate processing (for example, display processing and the like) even when it receives the target data from the printer 10 and the like.

In contrast, according to this illustrative embodiment, since the terminal-side server 80 can quickly transmit the response command 230 to the request command 200 to the terminal apparatus 100, it is possible to suppress the situation where the terminal apparatus 100 invalidates the transmission of the request command 200.

When the terminal-side server 80 receives the GETSUB command 280 and the like after transmitting the response command 230 to the terminal apparatus 100, the terminal-side server transmits the response command 320 including the situation information to the terminal apparatus 100. Thereby, the terminal apparatus 100 can know whether the transmission of the SUB command to the printer 10 and the like is completed. For example, when a time period for which the transmission of the SUB command to the specific printer is not executed exceeds a predetermined time period, the terminal apparatus 100 can display a message indicative of the same. Thereby, the user (i.e., the employee of the store) of the terminal apparatus 100 can know that the target data cannot be received from the specific printer, and can exclude the specific printer from a provision target of the replenishing service of sheets, disposables and the like.

As described above, according to this illustrative embodiment, since the terminal-side server 80 can appropriately transmit the response command 230 to the request command 200, the response command 320 to the GETSUB command 280 and the like to the terminal apparatus 100, it is possible to appropriately operate the terminal apparatus 100.

Although the exemplary embodiments have been specifically described, they are just exemplary and do not limit the claims. The technology defined in the claims includes a variety of modifications and changes to the above illustrative embodiments. For example, following modified embodiments are included.

Modified Embodiment 1

The 'condition information' may not the Subscribe command of the HTTP and may be other information (for example, a command of a protocol other than the HTTP) indicative of a condition for transmission of data to the terminal apparatus 100 from the printer 10 and the like. For example, the other information may be a command indicative of an instruction for transmitting data, which indicates that a remaining amount of the disposable of the printer 10 and the like is smaller than 10%, for example, to the terminal apparatus 100. Also, the 'inquiry command' may not be the GETSubscription command of the HTTP and may be other command (for example, a command of a protocol other than the HTTP) for inquiring of the terminal-side server 80 whether the transmission of the condition information to the printer 10 and the like is completed. For example, the other command may be a GET command of an SNMP (Simple Network Management Protocol).

Modified Embodiment 2

In the above illustrative embodiment, the request command 200 that is transmitted from the terminal apparatus 100 to the terminal-side server 80 includes the SUB command 202 and the printer ID (refer to FIG. 2). Instead of this configuration, for example, when the SUB command 202 is beforehand stored in the memory 94 of the terminal-side server 80 or the DB server 70, the request command 200 may not include the SUB command 202. In this case, when the terminal-side server 80 receives the request command 200, the terminal-side server may acquire the SUB command 202 from the memory 94 or DB server 70 and transmit the SUB command 202 to the printer-side server 50. Generally speaking, the request command may or may not include the condition information.

Modified Embodiment 3

The printer-side server 50 and the terminal-side server 80 that are separately configured may not be provided. That is, only one relay server that executes both the processing of the printer-side server 50 and the processing of the terminal-side server 80 may be provided.

Modified Embodiment 4

In the above illustrative embodiment, when the terminal-side server 80 receives the GETSUB command 280 and the like from the terminal apparatus 100, the terminal-side server acquires the status information 300 and the like from the printer-side server 50 and compares the status information 300 and the like with the situation information in the DB server 70. Instead of this configuration, the printer-side server 50 may not store the status information and the terminal-side server 80 may not acquire the status information from the printer-side server 50. In this case, although the situation information in the DB server 70 may not be updated, it is possible to reduce the processing loads of the respective servers 50, 80.

Modified Embodiment 5

The DB server 70 may not be separately configured from the terminal-side server 80 and may be provided in the terminal-side server 80.

Modified Embodiment 6

The 'communication apparatus' is not limited to the printer 10 and the like and may be a scanner, a copier, a multi-functional device, a portable terminal, a PC, a server and the like. The 'terminal apparatus' may not be equipped in the store of the printer 10 and the like and may be a PC in a home.

Modified Embodiment 7

In the above illustrative embodiment, the CPUs 62, 92 of the respective servers 50, 80 execute the programs (i.e., the software) in the memories 64, 94 to thereby implement the respective processing shown in FIGS. 2 to 6. Instead of this configuration, at least one processing of the respective processing shown in FIGS. 2 to 6 may be implemented by hardware such as a logical circuit.

Also, the technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A relay server system configured to communicate with a terminal apparatus and a communication apparatus, the relay server system comprising:
at least one processor;
at least one memory storing computer readable instructions, when executed by the at least one processor, causing the relay server system to:
receive a request command from the terminal apparatus, the request command being a command to request the relay server system to transmit condition information to the communication apparatus and the condition information being indicative of a condition to transmit data from the communication apparatus to the terminal apparatus;
transmit a first response command to the terminal apparatus when the relay server system receives the request command;
transmit the condition information to the communication apparatus when the relay server system receives the request command;
receive an inquiry command from the terminal apparatus after the relay server system receives the request command, the inquiry command being a command to inquire of the relay server system whether the transmission of the condition information to the communication apparatus is completed; and
transmit a second response command to the terminal apparatus when the relay server system receives the inquiry command, the second response command including situation information indicative of whether the transmission of the condition information to the communication apparatus is completed; and
a first server including a first processor of the at least one processor and a first memory of the at least one memory and a second server including a second processor of the at least one processor and a second memory of the at least one memory, the first server being separately configured from the second server,
wherein the first memory stores the instructions when executed by the first processor causes the first server to:
receive the request command from the terminal apparatus;
transmit the first response command to the terminal apparatus;
receive the inquiry command from the terminal apparatus; and
transmit the second response command to the terminal apparatus, and
wherein the second memory stores the instructions when executed by the second processor causes the second server to:
transmit the condition information to the communication apparatus.

2. The relay server system according to claim 1, wherein the request command received by the relay server system from the terminal apparatus includes the condition information.

3. The relay server system according to claim 1, wherein the instructions when executed by the at least one processor cause the relay server system:
to transmit the condition information to the communication apparatus when the relay server system receives the request command from the terminal apparatus at a state where connection is established between the communication apparatus and the relay server system through an Internet, and
not to transmit the condition information to the communication apparatus when the relay server system receives the request command from the terminal apparatus at a state where the connection is not established, and to transmit the condition information to the communication apparatus after the state where the connection is not established is changed to the state where the connection is established.

4. The relay server system according to claim 3, wherein the instructions when executed by the at least one processor cause the relay server system to:
receive a first request signal from the communication apparatus at the state where the connection is not established;
transmit, to the communication apparatus, a response signal with respect to the first request signal, the response signal including a session ID that is to be used for the connection;
receive a second request signal including the session ID from the communication apparatus after the relay server system transmits the response signal to the communication apparatus; and
establish the connection between the communication apparatus and the relay server system when the relay server system receives the second request signal from the communication apparatus.

5. The relay server system according to claim 1, wherein the request command includes a plurality of identification information to identify a plurality of the communication apparatuses,
the instructions when executed by the at least one processor cause the relay server system to:
sequentially transmit the condition information to each of the communication apparatuses when the relay server system receives the request command,
receive the inquiry command including the plurality of identification information from the terminal apparatus after the relay server system receives the request command, and
transmit, to the terminal apparatus, the second response command including a plurality of the situation information, which corresponds to the plurality of communication apparatuses identified by the plurality of identification information when the relay server system receives the inquiry command.

6. The relay server system according to claim 5, wherein the instructions stored in the first memory when executed by the first processor causes the first server to:
provide first identification information from among the plurality of identification information and the condition information with the second server, thereby the second server transmits the condition information to a first communication apparatus identified by the first identification information;

acquire, from the second server, a notification indicating that the transmission of the condition information to the first communication apparatus is completed; and provide second identification information from among the plurality of identification information, which is different from the first identification information, and the condition information with the second server after the notification is acquired from the second server, thereby the second server transmits the condition information to a second communication apparatus identified by the second identification information.

7. The relay server system according to claim 5, wherein the instructions stored in the first memory when executed by the first processor causes the first server to:

store the plurality of situation information in a database; and transmit the second response command including the plurality of situation information stored in the database to the terminal apparatus.

8. The relay server system according to claim 7, wherein the instructions stored in the first memory when executed by the first processor causes the first server to:

acquire a plurality of status information, which corresponds to the plurality of communication apparatuses, from the second server, each of the plurality of status information indicating whether the transmission of the condition information to the communication apparatus corresponding to the status information is completed, and update the plurality of situation information stored in the database to a content that is indicated by the plurality of status information when the plurality of situation information in the database is different from the plurality of status information.

9. The relay server system according to claim 8, wherein the instructions stored in the first memory when executed by the first processor causes the first server to acquire the plurality of status information from the second server when the first server receives the inquiry command from the terminal apparatus.

10. The relay server system according to claim 7, wherein the database is separately configured from the first server and the second server.

11. A non-transitory computer readable recording medium storing a program for a relay server system including at least one processor, storing instructions for a first server including a first processor of the at least one processor and storing instructions for a second server including a second processor of the at least one processor, the first server being separately configured from the second server, the program when executed by the at least one processor causing the relay server system to execute:

receive a request command from a terminal apparatus, the request command being a command to request the relay server system to transmit condition information to a communication apparatus and the condition information being indicative of a condition to transmit data from the communication apparatus to the terminal apparatus;

transmit a first response command to the terminal apparatus when the relay server system receives the request command;

transmit the condition information to the communication apparatus when the relay server system receives the request command;

receive an inquiry command from the terminal apparatus after the relay server system receives the request command, the inquiry command being a command to inquire of the relay server system whether the transmission of the condition information to the communication apparatus is completed; and transmit a second response command to the terminal apparatus when the relay server system receives the inquiry command, the second response command including situation information indicative of whether the transmission of the condition information to the communication apparatus is completed, wherein the instructions for the first server when executed by the first processor causes the first server to:

receive the request command from the terminal apparatus;

transmit the first response command to the terminal apparatus;

receive the inquiry command from the terminal apparatus; and transmit the second response command to the terminal apparatus, and wherein the instructions for the second server when executed by the second processor causes the second server to:

transmit the condition information to the communication apparatus.

* * * * *